US009806808B2

(12) United States Patent
Bhatnagar et al.

(10) Patent No.: US 9,806,808 B2
(45) Date of Patent: Oct. 31, 2017

(54) SIGNAL DETECTION SYSTEMS AND METHODS ON A FIBER CARRYING MULTIPLE WAVELENGTHS

(71) Applicant: Ciena Corporation, Hanover, MD (US)

(72) Inventors: Vipul Bhatnagar, Kensington, MD (US); Michael Y. Frankel, Bethesda, MD (US)

(73) Assignee: Ciena Corporation, Hanover, MD (US)

(*) Notice: Subject to any disclaimer, the term of this patent is extended or adjusted under 35 U.S.C. 154(b) by 181 days.

(21) Appl. No.: 14/927,915

(22) Filed: Oct. 30, 2015

(65) Prior Publication Data

US 2017/0122812 A1    May 4, 2017

(51) Int. Cl.
| G01J 3/46 | (2006.01) |
| H04B 10/079 | (2013.01) |
| G01J 9/00 | (2006.01) |
| G01J 3/50 | (2006.01) |
| G01J 9/04 | (2006.01) |

(52) U.S. Cl.
CPC ......... H04B 10/07957 (2013.01); G01J 3/46 (2013.01); G01J 3/50 (2013.01); G01J 9/00 (2013.01); G01J 9/04 (2013.01)

(58) Field of Classification Search
CPC ........ G01J 9/00; G01J 3/46; G01J 3/50; G01J 3/51; G01J 3/52; H04W 12/06; H04W 8/08; H04J 14/02; H04Q 11/00; H04B 10/07957
See application file for complete search history.

(56) References Cited

U.S. PATENT DOCUMENTS

| 6,556,321 B1 | 4/2003 | Milton et al. |
| 6,765,659 B1 | 7/2004 | Bhatnagar et al. |
| 7,512,336 B1 | 3/2009 | Meli et al. |
| 7,873,286 B2 | 1/2011 | Frankel |
| 8,005,375 B2 | 8/2011 | Frankel |
| 8,103,166 B2 | 1/2012 | Liu |
| 8,244,125 B2 | 8/2012 | Biegert et al. |
| 8,433,192 B2 | 4/2013 | Frankel et al. |
| 8,554,074 B2 | 10/2013 | Boertjes et al. |
| 8,761,610 B2 | 6/2014 | Frankel |

(Continued)

Primary Examiner — Abdullahi Nur
(74) Attorney, Agent, or Firm — Clements Bernard Walker PLLC; Christopher L. Bernard; Lawrence A. Baratta, Jr.

(57) ABSTRACT

Systems and methods to detect a wavelength of interest ($\lambda_{RX}$) amongst one or more wavelengths ($\lambda_1, \lambda_2, \ldots, \lambda_N$) include receiving the one or more wavelengths ($\lambda_1, \lambda_2, \ldots, \lambda_N$); using a portion of a transmitted wavelength ($\lambda_{TX}$) as a Local Oscillator (LO) signal to perform performing coherent detection with the one or more wavelengths, wherein the transmitted wavelength ($\lambda_{TX}$) and the wavelength of interest ($\lambda_{RX}$) are a bi-directional communication link; and determining a presence of the wavelength of interest ($\lambda_{RX}$) based on the coherent detection.

20 Claims, 11 Drawing Sheets

(56) References Cited

U.S. PATENT DOCUMENTS

| | | |
|---|---|---|
| 2006/0115266 A1 | 6/2006 | Levi et al. |
| 2009/0103915 A1 | 4/2009 | Aprile et al. |
| 2009/0169208 A1 | 7/2009 | Grigoryan et al. |
| 2009/0196602 A1 | 8/2009 | Saunders et al. |
| 2010/0150566 A1* | 6/2010 | Soto .................... H04B 10/272 398/115 |
| 2012/0237211 A1 | 9/2012 | Iizuka et al. |
| 2012/0321320 A1 | 12/2012 | Yu |
| 2013/0114953 A1 | 5/2013 | Moynihan et al. |

\* cited by examiner

SIGNAL DETECTION SYSTEMS AND METHODS ON A FIBER CARRYING MULTIPLE WAVELENGTHS

FIELD OF THE DISCLOSURE

The present disclosure generally relates to optical networking systems and methods. More particularly, the present disclosure relates to signal detection systems and methods on a fiber carrying multiple wavelengths that can determine the presence or absence of a specific wavelength.

BACKGROUND OF THE DISCLOSURE

Variously, signal presence detectors, optical channel power monitors, etc. are used to detect the presence or absence of a wavelength in optical protection switching systems. For example, optical 1+1 path protection schemes are used to protect communication links from path failures (e.g., fiber cuts) since fiber cuts are significantly more likely than transceiver failures. In a 1+1 path protection scheme, a signal originating from a single transmitter is transmitted to a single receiver over two independent paths, preferably diverse from one another. At the receiver's location, for each of the two terminating paths, the signal of interest is monitored by a signal presence (SP) monitor and a 2×1 optical switch selects one of the two paths based upon signal presence monitoring. If the selected input's signal is absent, and the alternate signal is present, the switch will select the alternate signal. A common implementation for 1+1 path protection of an optical communication link is to use a 50:50 power splitter to duplicate the transmitted signal for transmission over the two independent paths, and a 2×1 optical switch with signal presence detectors at each input to select an active path.

When a communication link is bidirectional, each end of the link has a transmitter and a receiver and providing 1+1 path protection requires placement of a 50:50 power splitter and a 2×1 switch with signal presence detectors at each end of the link. A common hardware implementation is an "Optical Protection Switch" (OPS). Conventionally, an optical filter precedes the OPS switch, affording two simplifications: (1) the OPS's signal presence monitors can be signal taps with integrated power monitors, providing a simple and low-cost solution; and (2) there are no interfering signals present at the receiver, and therefore, no additional filtering required to receive the signal of interest.

Receivers have started using coherent detection techniques, which relaxes or eliminates the need for an optical filter to precede the receiver. Specifically, coherent detection systems typically receive a fiber with a plurality of wavelengths and tune to the wavelength of interest, i.e., the connection to a receiver may contain interfering wavelengths. Interfering wavelengths are rejected and filtered out within the coherent receiver. Specifically, it is not possible to simply monitor total integrated power to detect the loss of a wavelength of interest since it would not indicate which specific wavelength or wavelengths have been changed. A conventional signal presence detector that performs in a multi-signal environment include (1) an optical tap followed by a tunable bandpass filter followed by a photodetector, with the tunable filter set to the wavelength being protected by the 1+1 scheme; (2) an optical tap followed by a scanning filter followed by a photodetector; and (3) an optical tap followed by a wavelength demultiplexer, each demultiplexed port terminating at a unique photodetector. Disadvantageously, these solutions are expensive, requiring a spectrometer for each of the signal presence monitors, or a single spectrometer that is time-shared between the two switch inputs. Another approach may include installing a communication port at the OPS where an external input (e.g., network management system, control plane, Software Defined Networking (SDN) controller, etc.) can relay port status. This approach requires additional processing in the OPS and a communication path for control of the OPS.

In order to extend 1+1 path protection using an OPS to links using coherent receivers with wavelength demultiplexers that do not optically filter wavelengths, it is, therefore, desirable to develop a single wavelength presence monitor that performs in a multi-wavelength environment.

BRIEF SUMMARY OF THE DISCLOSURE

In an exemplary embodiment, a method to detect a wavelength of interest ($\lambda_{RX}$) amongst one or more wavelengths ($\lambda_1, \lambda_2, \ldots, \lambda_N$) includes receiving the one or more wavelengths ($\lambda_1, \lambda_2, \ldots, \lambda_N$); using a portion of a transmitted wavelength ($\lambda_{TX}$) as a Local Oscillator (LO) signal to perform coherent detection with the one or more wavelengths, wherein the transmitted wavelength ($\lambda_{TX}$) and the wavelength of interest ($\lambda_{RX}$) are a bi-directional communication link; and determining a presence of the wavelength of interest ($\lambda_{RX}$) in the one or more wavelengths based on the coherent detection. The wavelength of interest ($\lambda_{RX}$) can be approximately equal to transmitted wavelength ($\lambda_{TX}$) to within signal spectral occupancy. The transmitted wavelength ($\lambda_{TX}$) can be transmitted by a transmitter, and wherein the transmitter can be part of one of a transceiver and an optical modem. The receiving can be performed separately from two paths, wherein the using can include forming two signals T1 and T2 each with the transmitted wavelength ($\lambda_{TX}$) as the Local Oscillator (LO) signal, and wherein the coherent detection uses the signals T1 and T2 with the one or more wavelengths ($\lambda_1, \lambda_2, \ldots, \lambda_N$) from each of the two paths to determine the presence on each of the two paths. The method can further include utilizing the presence in optical 1+1 path protection.

The transmitted wavelength ($\lambda_{TX}$) and the wavelength of interest ($\lambda_{RX}$) have different modulated data thereon, and the coherent detection can be used for power detection and not data detection. The coherent detection can include a balanced coupler with differential detectors followed by a Radio Frequency (RF) envelope detector adapted to measure a power of a baseband signal to determine the presence of $\lambda_{RX}$. The portion can be formed by a tap off of a transmitter adapted to transmit the transmitted wavelength ($\lambda_{TX}$). The transmitted wavelength ($\lambda_{TX}$) and the wavelength of interest ($\lambda_{RX}$) can be dual-polarization signals, and wherein the coherent detection can include a coupler adapted to receive the LO signal and the one or more wavelengths ($\lambda_1, \lambda_2, \ldots, \lambda_N$) and provide outputs to two detectors which provide a subtracted output to an envelope detector. The transmitted wavelength ($\lambda_{TX}$) and the wavelength of interest ($\lambda_{RX}$) can be single polarization signals, and wherein the coherent detection is performed on two polarizations to determine the presence. The transmitted wavelength ($\lambda_{TX}$) can be transmitted by a local transmitter and the wavelength of interest ($\lambda_{RX}$) is received by a local receiver.

In another exemplary embodiment, an apparatus adapted to detect a wavelength of interest ($\lambda_{RX}$) amongst one or more wavelengths ($\lambda_1, \lambda_2, \ldots, \lambda_N$) includes one or more couplers adapted to receive the one or more wavelengths ($\lambda_1, \lambda_2, \ldots, \lambda_N$) and a portion of a transmitted wavelength ($\lambda_{TX}$) as a Local Oscillator (LO) signal, wherein the transmitted wavelength ($\lambda_{TX}$) and the wavelength of interest ($\lambda_{RX}$) are a bi-directional communication link; a plurality of detectors adapted to receive outputs from the one or more couplers, wherein the one or more couplers and the plurality of detectors are adapted to perform coherent detection with the one or more wavelengths and the LO signal; and an envelope detector adapted to receive a combined output from the plurality of detectors and adapted to determine a presence of the wavelength of interest ($\lambda_{RX}$) in the one or more wavelengths. The wavelength of interest ($\lambda_{RX}$) can be approximately equal to transmitted wavelength ($\lambda_{TX}$) to within signal spectral occupancy. The transmitted wavelength ($\lambda_{TX}$) can be transmitted by a transmitter, and wherein the transmitter can be part of one of a transceiver and an optical modem. The one or more wavelengths ($\lambda_1, \lambda_2, \ldots, \lambda_N$) can be separately received from two paths, wherein the two signals T1 and T2 are formed from a transmitter with the transmitted wavelength ($\lambda_{TX}$) as the Local Oscillator (LO) signal, and wherein the signals T1 and T2 are used with the one or more wavelengths ($\lambda_1, \lambda_2, \ldots, \lambda_N$) from each of the two paths to determine the presence on each of the two paths.

The transmitted wavelength ($\lambda_{TX}$) and the wavelength of interest ($\lambda_{RX}$) have different modulated data thereon, and the coherent detection is used for power detection and not data detection. The coherent detection can include a balanced coupler with differential detectors followed by the envelope detector adapted to measure a power of a baseband signal to determine the presence. The portion can be formed by a tap off of a transmitter adapted to transmit the transmitted wavelength ($\lambda_{TX}$). The transmitted wavelength ($\lambda_{TX}$) and the wavelength of interest ($\lambda_{RX}$) can be single polarization signals, and wherein the coherent detection is performed on two polarizations to determine the presence.

In a further exemplary embodiment, an optical 1+1 path protection system includes a splitter adapted to receive and split a transmitted wavelength ($\lambda_{TX}$), wherein a split portion of a transmitted wavelength ($\lambda_{TX}$) is used a Local Oscillator (LO) signal; a selector adapted to receive two inputs each including one or more wavelengths ($\lambda_1, \lambda_2, \ldots, \lambda_N$); and a signal presence monitor adapted to determine a presence of a wavelength of interest ($\lambda_{RX}$) in each of the two inputs based on coherent detection using the LO signal and the one or more wavelengths ($\lambda_1, \lambda_2, \ldots, \lambda_N$), wherein the signal presence monitor is adapted to control the selector based on the presence, and wherein the transmitted wavelength ($\lambda_{TX}$) and the wavelength of interest ($\lambda_{RX}$) are a bi-directional communication link.

BRIEF DESCRIPTION OF THE DRAWINGS

The present disclosure is illustrated and described herein with reference to the various drawings, in which like reference numbers are used to denote like system components/method steps, as appropriate, and in which:

FIG. 8 illustrates the topology of the network, FIG. 9 illustrates associated OPS components at originating and terminating nodes, and FIG. 10 illustrates activity based on a fiber cut between the originating and terminating nodes.

DETAILED DESCRIPTION OF THE DISCLOSURE

In various exemplary embodiments, the present disclosure relates to signal detection systems and methods on a fiber carrying multiple wavelengths that can determine the presence or absence of a specific wavelength. The systems and methods utilize a low-cost coherent detection scheme to detect the presence of a data-modulated wavelength on a fiber carrying multiple data wavelengths by using a local transceiver transmitted signal on the receiving end as a Local Oscillator (LO) reference. Specifically, the systems and methods utilize the fact that an optical transceiver (or optical modem) will generally have the same wavelength received that is transmitted. Thus, the transmitter can be used as the LO; it is not relevant that the transmitter and receiver may have different data since the systems and methods are merely detecting the absence or presence of the wavelength on the receiving end. Advantageously, instead of using a spectrometer which is expensive to detect wavelength presence, the systems and methods leverage the presence of a signal that is co-located and frequency-locked to the incoming wavelength of interest, namely the transmitted signal, as the LO for coherent detection. Further, rather than using phase-diversity schemes such as an optical 90-degree hybrid for signal mixing, the systems and methods use a simple 2×2 optical coupler. The systems and methods contemplate use, for example, in optical path selection in optical protection schemes, such as a 1+1 path protection scheme.

Figure 1:
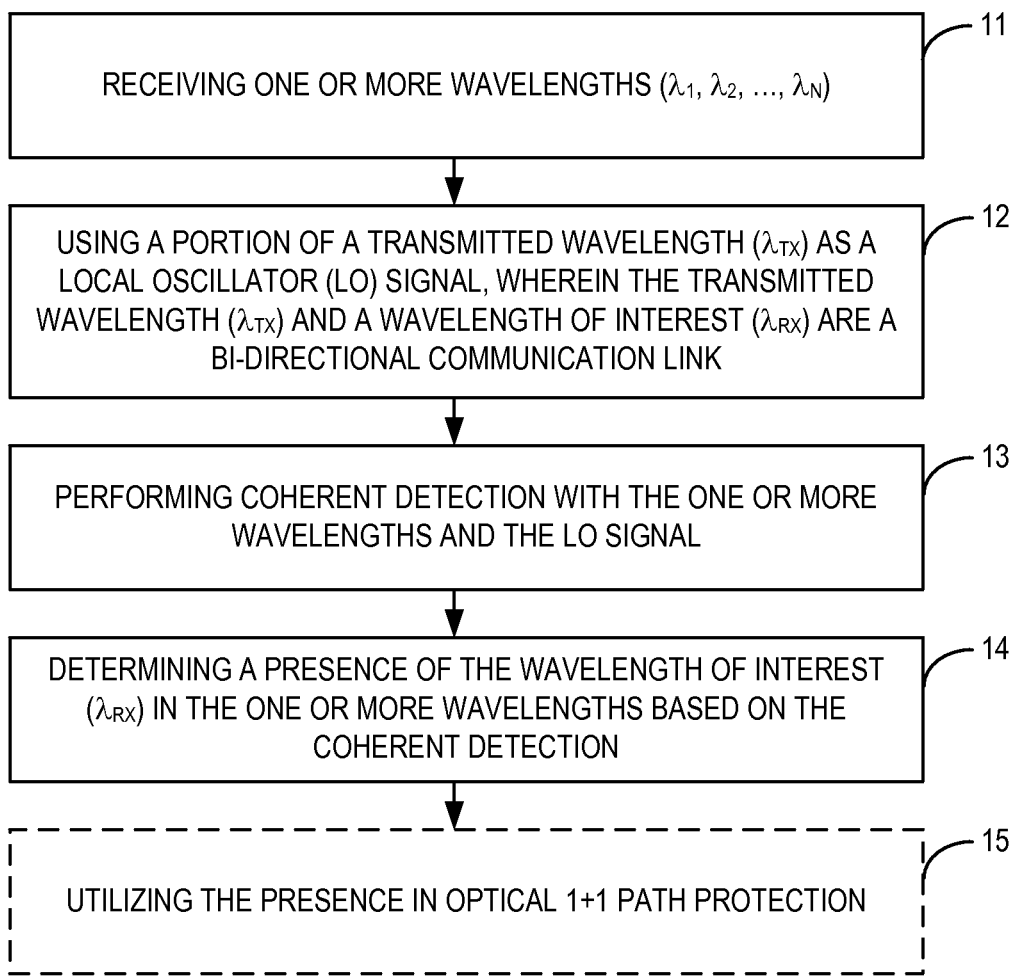
FIG. 1 is a flowchart of a process to detect a wavelength of interest ($\lambda_{RX}$) amongst one or more wavelengths ($\lambda_1, \lambda_2, \ldots, \lambda_N$)

Referring to FIG. 1, in an exemplary embodiment, a flowchart illustrates a process 10 to detect a wavelength of interest ($\lambda_{RX}$) amongst one or more wavelengths ($\lambda_1, \lambda_2, \ldots, \lambda_N$). The process 10 includes receiving the one or more wavelengths ($\lambda_1, \lambda_2, \ldots, \lambda_N$) (step 11); using a portion of a transmitted wavelength ($\lambda_{TX}$) as a Local Oscillator (LO) signal, wherein the transmitted wavelength ($\lambda_{TX}$) and the wavelength of interest ($\lambda_{RX}$) are a bi-directional communication link where $\lambda_{TX}$ are $\lambda_{RX}$ are within the range of signal spectral width of each other (step 12); performing coherent detection with the one or more wavelengths and the LO signal (step 13); and determining a presence of the wavelength of interest ($\lambda_{RX}$) in the one or more wavelengths based on the coherent detection (step 14). Optionally, the process 10 includes utilizing the presence in optical 1+1 path protection (step 15).

The wavelength of interest ($\lambda_{RX}$) is approximately equal to the transmitted wavelength ($\lambda_{TX}$), such as to within the range of signal spectral width. The receiving step 11 can be performed by a receiver and the transmitted wavelength ($\lambda_{TX}$) is transmitted by a transmitter, and the transmitter and the receiver can be part of a transceiver or an optical modem. For optical 1+1 path protection, for example, the receiving step 11 is performed separately on each of the two paths, the using step 12 includes forming two signals T1 and T2 each with the transmitted wavelength ($\lambda_{TX}$) as the Local Oscillator (LO) signal, and the performing step 13 uses the signals T1 and T2 with the one or more wavelengths ($\lambda_1, \lambda_2, \ldots, \lambda_N$) from each of the two paths to determine the presence on each of the two paths.

The transmitted wavelength ($\lambda_{TX}$) and the wavelength of interest ($\lambda_{RX}$) have different modulated data thereon, and the coherent detection is used for power detection and not data detection. That is, the bit patterns between the transmitted wavelength ($\lambda_{TX}$) and the wavelength of interest ($\lambda_{RX}$) are decorrelated and randomly shifted. The coherent detection can include a balanced coupler with differential detectors followed by a Radio Frequency (RF) envelope detector adapted to measure the power of a baseband signal to determine the signal presence. The LO portion can be formed by a tap off of a transmitter adapted to transmit the transmitted wavelength ($\lambda_{TX}$). The transmitted wavelength ($\lambda_{TX}$) and the wavelength of interest ($\lambda_{RX}$) can be dual-polarization signals, and the coherent detection includes a coupler adapted to receive the LO signal and the one or more wavelengths ($\lambda_1, \lambda_2, \ldots, \lambda_N$) and provide outputs to two detectors which provide a subtracted output to an envelope detector. The transmitted wavelength ($\lambda_{TX}$) and the wavelength of interest ($\lambda_{RX}$) can be single polarization signals, and the coherent detection can be performed on two polarizations to determine the presence. The transmitted wavelength ($\lambda_{TX}$) can be transmitted by a local transmitter and the wavelength of interest ($\lambda_{RX}$) can be received by a local receiver.

Figure 2A:
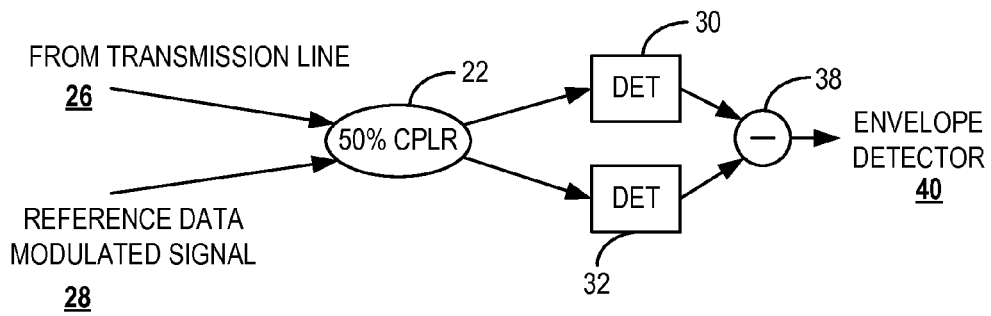
FIGS. 2A and 2B are block diagrams of an apparatus adapted to detect a wavelength of interest ($\lambda_{RX}$) amongst one or more one or more wavelengths ($\lambda_1, \lambda_2, \ldots, \lambda_N$) with FIG. 2A for the case when $\lambda_{RX}$ is a dual-polarization signal and FIG. 2B for the case when $\lambda_{RX}$ is a single polarization signal.
Figure 2B:
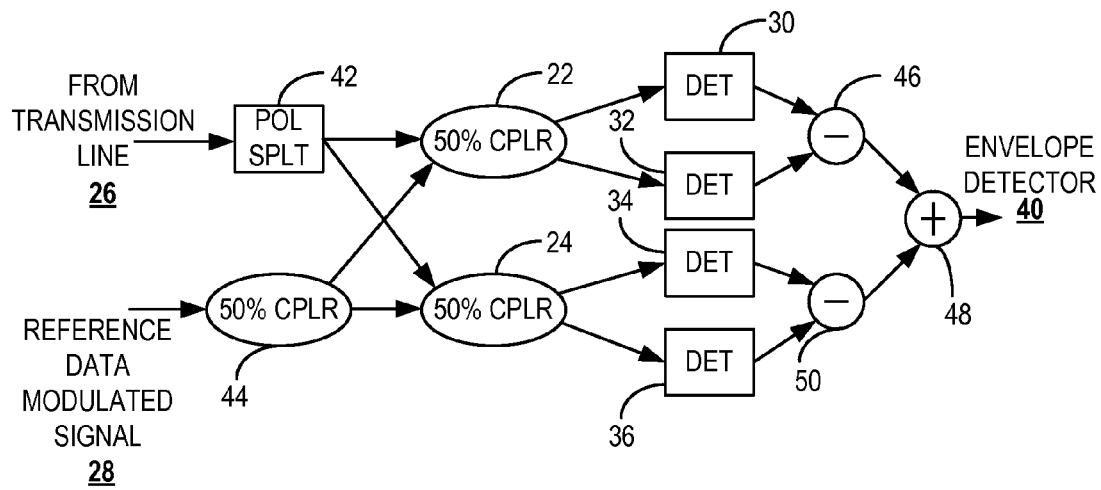

Referring to FIGS. 2A and 2B, in exemplary embodiments, block diagrams illustrate an apparatus 20 adapted to detect a wavelength of interest ($\lambda_{RX}$) amongst one or more wavelengths ($\lambda_1, \lambda_2, \ldots, \lambda_N$) with FIG. 2A used when $\lambda_{RX}$ and $\lambda_{TX}$ are dual-polarization signals and FIG. 2B used when $\lambda_{RX}$ and $\lambda_{TX}$ are single polarization signals. Specifically, an apparatus 20A in FIG. 2A simultaneously performs coherent detection on both polarizations since the signals are dual-polarization whereas an apparatus 20B in FIG. 2B checks both polarizations separately since the signals are single polarization to ensure the signal is absent or present. Specifically, in the single polarization signals, a polarization diversity structure is required. Note, functionally, the apparatus 20A, 20B are similar, both performing the process 10.

The apparatus 20A, 20B include one or more couplers 22, 24 adapted to receive one or more wavelengths ($\lambda_1, \lambda_2, \ldots, \lambda_N$) 26 from a transmission line and a portion of a transmitted wavelength ($\lambda_{TX}$) as a Local Oscillator (LO) signal 28 for a reference data modulated signal. Again, the transmitted wavelength ($\lambda_{TX}$) and the wavelength of interest ($\lambda_{RX}$) are a bi-directional communication link, and the apparatus 20A, 20B make use of this fact to use the transmitted wavelength ($\lambda_{TX}$) as the LO signal to perform simple, coherent detection to determine the presence of the wavelength of interest ($\lambda_{RX}$). The couplers 22, 24 can be 2×2 balanced couplers which take two separate inputs, i.e., the wavelengths 26 and the LO signal 28, and output two separate outputs each containing a combination of both inputs.

The apparatus 20A, 20B include a plurality of detectors 30, 32, 34, 36 adapted to receive outputs from the one or more couplers 22, 24, wherein the one or more couplers 22, 24 and the plurality of detectors 30, 32, 34, 36 are adapted to perform coherent detection with the one or more wavelengths 26 and the LO signal 28. Specifically, the apparatus 20A includes the coupler 22 which has two outputs, each containing a combination of the one or more wavelengths 26 and the LO signal 28, provided to the detectors 30, 32. Outputs of the detectors 30, 32 are subtracted 38 from one another and provided to an envelope detector 40. The envelope detector 40 is adapted to receive a combined output from the plurality of detectors 30, 32 and adapted to determine a presence of the wavelength of interest ($\lambda_{RX}$).

The apparatus 20B includes a polarization diversity structure to support a single polarization signal. Again, if the signals are single polarization, both polarizations must be checked to determine the presence of the wavelength of interest ($\lambda_{RX}$). The apparatus 20B includes a polarization splitter 42 which splits two polarizations of the one or more wavelengths ($\lambda_1, \lambda_2, \ldots, \lambda_N$) 26 to two couplers 22, 24. The LO signal 28 is split by a coupler 44 and provided to the couplers 22, 24 as well. The coupler 22, 24 output to the detectors 30, 32, 34, 36. The detectors 30, 32 are subtracted 46 from one another and provided to a combiner 48. The detectors 34, 36 are subtracted 50 from one another and provided to the combiner 48. An output of the combiner 48 is provided to the envelope detector 40.

Again, the wavelength of interest ($\lambda_{RX}$) is approximately equal to transmitted wavelength ($\lambda_{TX}$) to within modulated signal spectral occupancy. A receiver can be adapted to receive the one or more wavelengths ($\lambda_1, \lambda_2, \ldots, \lambda_N$) and the transmitted wavelength ($\lambda_{TX}$) can be transmitted by a transmitter, and wherein the transmitter and the receiver can be part of one of a transceiver and an optical modem. The one or more wavelengths ($\lambda_1, \lambda_2, \ldots, \lambda_N$) can be separately received from two paths, wherein the two signals T1 and T2 can be formed from a transmitter with the transmitted wavelength ($\lambda_{TX}$) as the Local Oscillator (LO) signal, and wherein the signals T1 and T2 can be used with the one or more wavelengths ($\lambda_1, \lambda_2, \ldots, \lambda_N$) from each of the two paths to determine the presence on each of the two paths.

The transmitted wavelength ($\lambda_{TX}$) and the wavelength of interest ($\lambda_{RX}$) have different modulated data thereon, and the coherent detection is used for power detection and not data detection. That is, the bit patterns between the transmitted wavelength ($\lambda_{TX}$) and the wavelength of interest ($\lambda_{RX}$) are decorrelated and randomly shifted. The coherent detection can include a balanced coupled with differential detectors followed by the envelope detector adapted to measure a power of a baseband signal to determine the presence. The portion of the transmitted wavelength ($\lambda_{TX}$) can be formed by a tap off of a transmitter adapted to transmit the transmitted wavelength ($\lambda_{TX}$). The transmitted wavelength ($\lambda_{TX}$) and the wavelength of interest ($\lambda_{RX}$) can be single polarization signals, and wherein the coherent detection is performed on two polarizations to determine the presence.

Figure 3A:
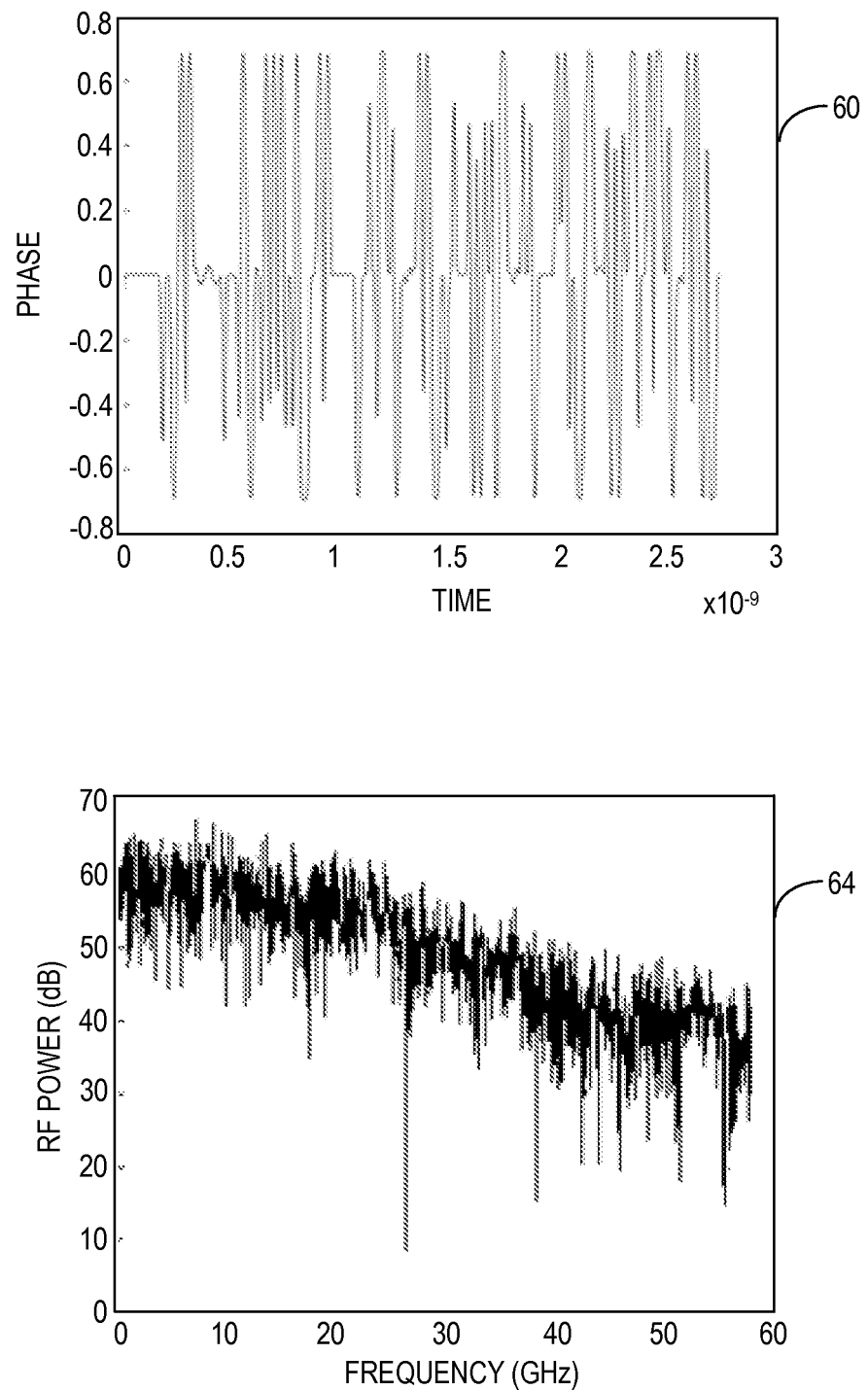
FIGS. 3A and 3B are graphs of an exemplary operation of the process of FIG. 1 and the apparatus of FIG. 2A with a single polarization 30 Gbaud Quadrature Phase Shift Keying (QPSK) signal.
Figure 3B:
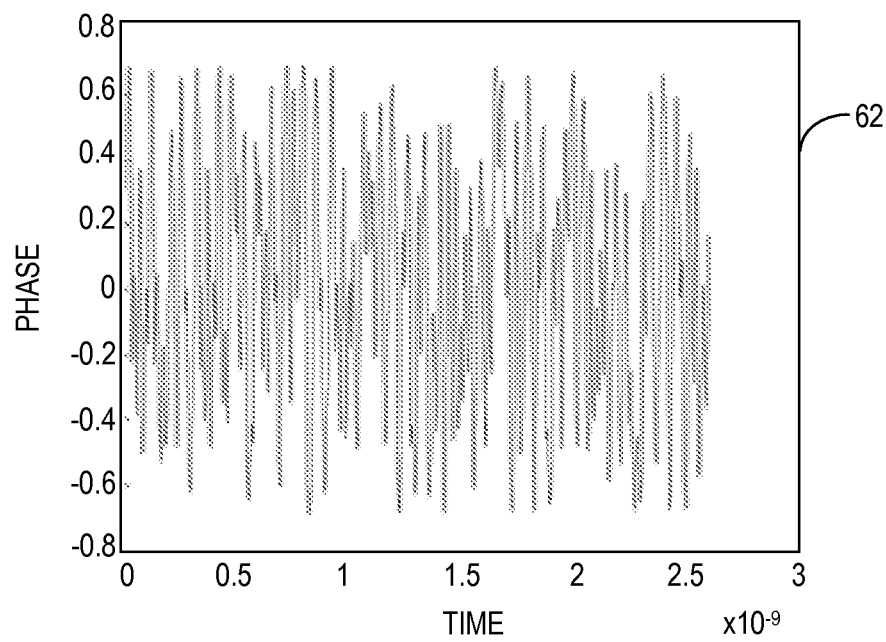
Figure 3B:
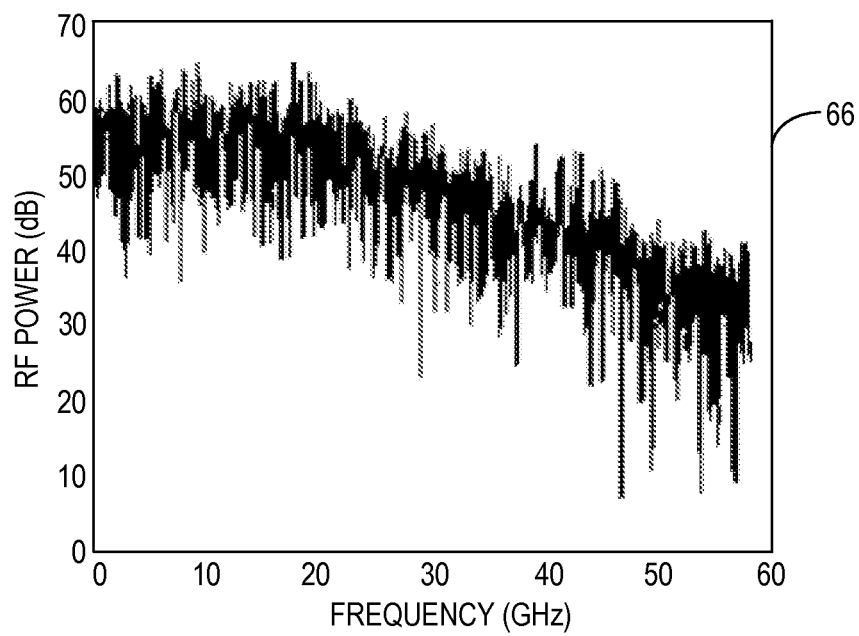

Referring to FIGS. 3A and 3B, in an exemplary embodiment, graphs 60, 62, 64, 66 illustrate an exemplary operation of the process 10 and the apparatus 20A, 20B with a single polarization 30 Gbaud Quadrature Phase Shift Keying (QPSK) signal. In both FIGS. 3A and 3B, the top graphs 60, 62 illustrate a combination of the LO signal 28 and the one or more wavelengths 26 ($\lambda_1, \lambda_2, \ldots, \lambda_N$) with the wavelength of interest ($\lambda_{RX}$) present (i.e., the beat signal). The bottom graphs 64, 66 illustrates the RF power spectrum from the combination.

FIG. 3A illustrates zero frequency offset between the LO signal 28 and the wavelength of interest ($\lambda_{RX}$) in the graph 60. Sharp spikes detect bit phase jumps in the QPSK modulation. In the bottom graph 64, notice RF power extends to about 60 GHz which makes sense given that two 30 Gbaud signals are mixed (the LO signal 28 and the wavelength of interest ($\lambda_{RX}$)). FIG. 3B illustrates a 10 GHz frequency offset between the LO signal 28 and the wavelength of interest ($\lambda_{RX}$) in the graph 62. In the bottom graph 66, notice there is no visible beat signal at 10 GHz due to random signal phase jumps. Note, in simulations and experimentation, it was determined that the process 10 works with the LO signal 28 and the wavelength of interest ($\lambda_{RX}$) when the wavelength of interest ($\lambda_{RX}$) is approximately equal to transmitted wavelength ($\lambda_{TX}$) to within signal spectral occupancy.

For the envelope detector 40, notice a strong RF signal-signal beat spectrum content in FIGS. 3A and 3B, with frequency components extending to 60 GHz. However, for practical implementations of the envelope detector 40, it is sufficient to detect RF power within some low-frequency range, as for example within ~3 GHz window. In an exemplary embodiment, the envelope detector 40 can be a rectifier with a logarithmic amplifier. The envelope detector 40 measures power and if the power exceeds a pre-defined threshold, the wavelength of interest ($\lambda_{RX}$) is deemed present.

Figure 4:
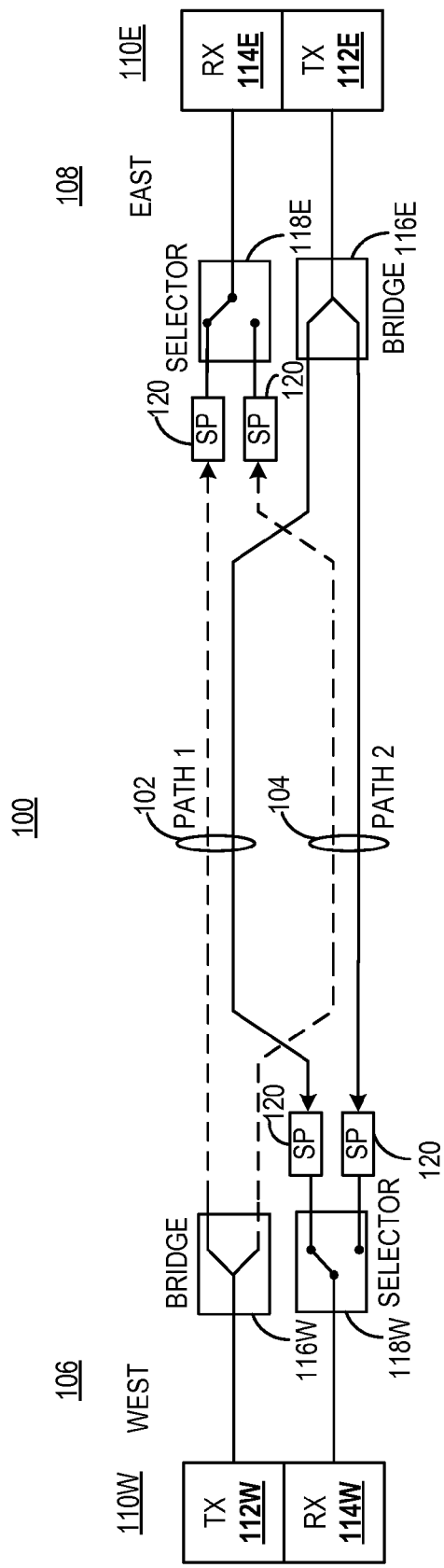
FIG. 4 is a network diagram of an optical network with optical 1+1 path protection with a first path and a second path which can utilize the process of FIG. 1 and the apparatus of FIGS. 2A and 2B.

Referring to FIG. 4, in an exemplary embodiment, a network diagram illustrates an optical network 100 with optical 1+1 path protection with a first path 102 and a second path 104 which can utilize the process 10 and the apparatus 20A, 20B. The optical network 100 includes a west node 106 and an east node 108, interconnected to one another via various components in the optical network 100 (not shown). The paths 102, 104 can be diverse through the optical network 100. Note, for illustration purposes, the various components are omitted, but may include, for example, optical amplifiers, wavelength multiplexers and demultiplexers, regenerators, optical fiber, etc. The nodes 106, 108 each includes an optical modem 110, i.e., an optical modem 110W at the node 106 and an optical modem 110E at the node 108. The optical modems 110 each includes a transmitter 112, labeled as transmitters 112W, 112E, and a receiver 114, labeled as receivers 114W, 114E. In operation, the transmitter 112W is communicatively coupled to the receiver 114E and the transmitters 112E is communicatively coupled to the receiver 114W, forming a bi-directional communication link.

The optical 1+1 path protection is used to protect the communication between the nodes 106, 108 from path failures in the optical network 100. Again, the optical modems 110 are extremely costly, and the most likely failures in the optical network 100 are between the optical modems 110. The optical 1+1 path protection enables a low-cost, efficient protection scheme, without doubling of the optical modems 110. The optical 1+1 path protection can operate by splitting an output from the transmitter 112 to both of the paths 102, 104 and receiving an input from the receiver 114 from both of the paths 102, 104 and selecting the input based on the presence or absence of the signal. Again, the process 10 and/or the apparatus 20A, 20B enable a determination of the presence or absence of the signal amongst a plurality of signals, using the corresponding transmitted signal as an LO in coherent detection.

In an exemplary embodiment, the optical 1+1 path protection is formed by a bridge 116, labeled as bridges 116W, 116E, and a selector 118, labeled as selectors 118W, 118E. In the optical 1+1 path protection, a signal originating from a single transmitter 112 is transmitted to a single receiver 114 over the paths 102, 104. The bridge 116 can be a 1:N splitter which splits the transmitted signal to N outputs. The bridge 116W receives a signal from the transmitter 112W and splits the signal to the paths 102, 104 where it is received at the selector 118E. The selector 118 is a switch configured to receive two inputs, from the paths 102, 104, and provide a single output to the receiver 114.

At the receiver's location, for each of the two terminating paths 104, 106, the signal of interest is monitored by a signal presence (SP) monitor 120. The SP monitor 120 is used to determine the absence or presence of the signal and to control the selector 118 based thereon. If the selected input's signal is absent, and the alternate signal is present, the selector 118 can select the alternate signal. Again, as described herein, when there is a filter present prior to the SP monitor 120, the SP monitor 120 can be a power detector which determines the presence or absence of the signal. With coherent modems with no wavelength-selecting demultiplexer, the signal may be one of many, preventing the use of the power detector for detection.

As described herein, the process 10 and the apparatus 20A, 20B provide detection of the presence of a particular data-modulated wavelength ($\lambda_{RX}$) on a fiber carrying multiple data wavelengths ($\lambda_1, \lambda_2, \ldots, \lambda_N$). Again, the detection technique can be used for various applications, and for illustration purposes and in an exemplary embodiment, the detection technique is described for optical 1+1 path protection of a link operating at that particular wavelength ($\lambda_{RX}$). Specifically, the SP monitor 120 can implement the process 10 and/or include the apparatus 20A, 20B.

Figure 5:
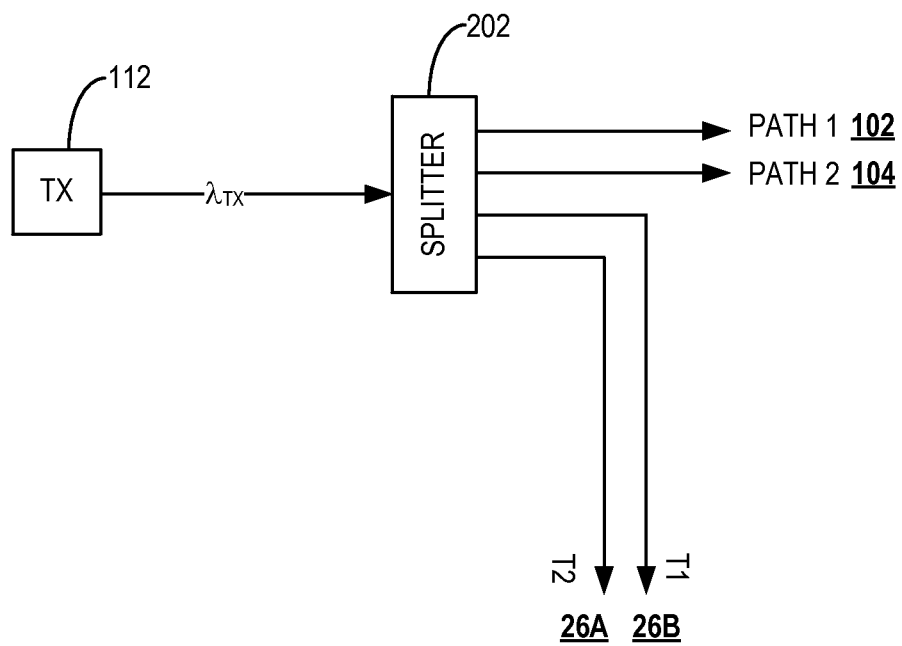
FIG. 5 is a schematic diagram of a transmitter arrangement which forms the Local Oscillator (LO) signal from a transmitter.

Referring to FIG. 5, in an exemplary embodiment, a schematic diagram illustrates a transmitter arrangement 200 which forms the LO signal 26 from the transmitter 112 output. The transmitter arrangement 200 can be used in the optical network 100 at the nodes 106, 108 to provide the LO signal 26. The transmitter 112 outputs a data-modulated signal on the transmitted wavelength ($\lambda_{TX}$) and is connected to a power splitter 202. In the exemplary embodiment for the optical 1+1 path protection, the splitter can be a 1:4 splitter which outputs the transmitted wavelength ($\lambda_{TX}$) to the paths 102, 104 and which forms two LO signals T1, T2 26A, 26B. Note, the two LO signals T1, T2 26A, 26B are each used for detecting one or more wavelengths ($\lambda_1, \lambda_2, \ldots, \lambda_N$) on the paths 102, 104. Note that the two LO signals T1, T2 26A, 26B contain a single wavelength at the transmitted wavelength ($\lambda_{TX}$), and the detection techniques described here utilize a property that a transceiver or modem wavelength is the same in both directions of a typical fiber-optic link, i.e., a bi-directional communication link. Again, in the optical 1+1 path protection, the paths 102, 104 are used for work and protect paths.

Figure 6:
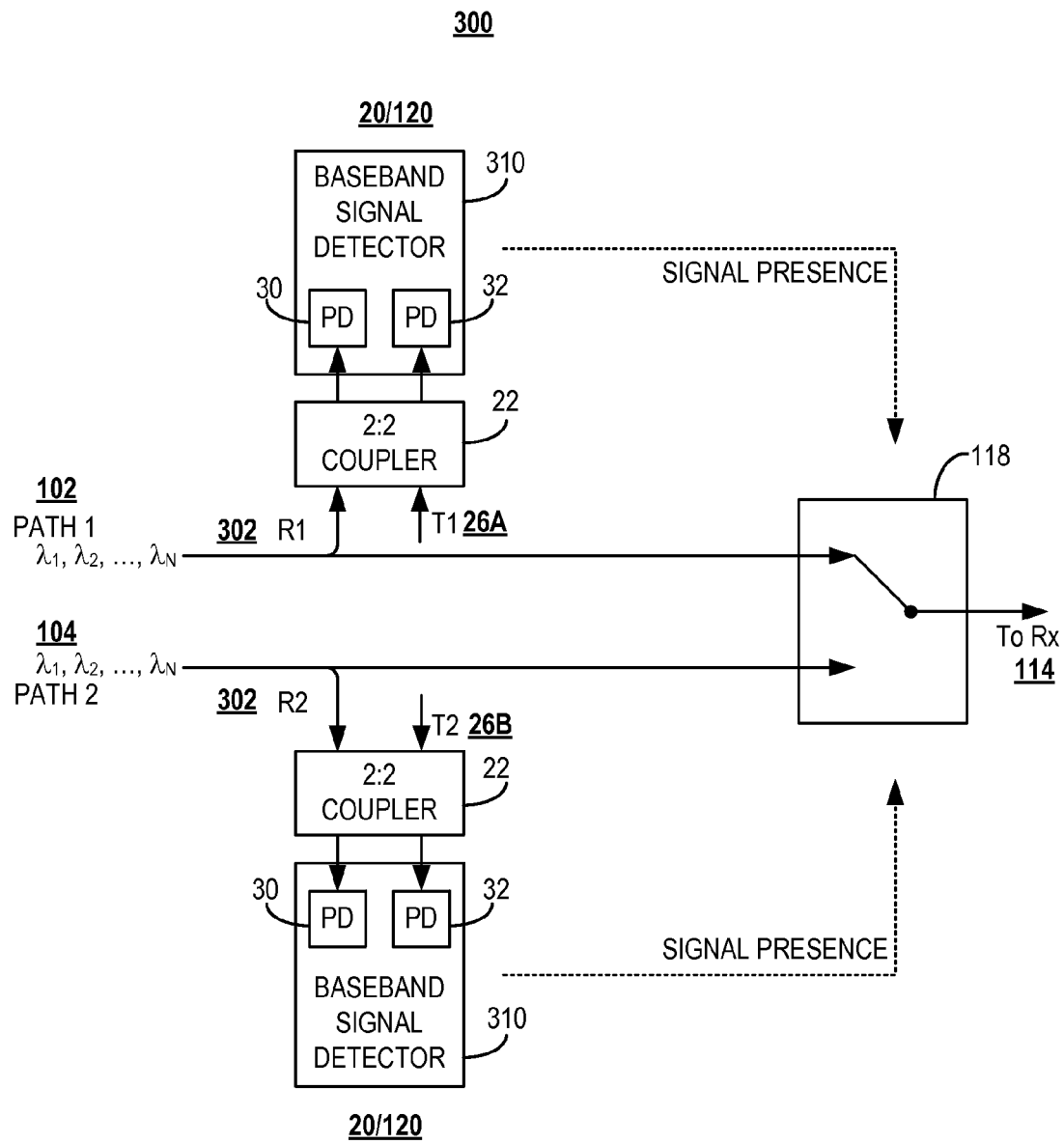
FIG. 6 is a schematic diagram of a selector control arrangement using the SP monitor in FIG. 4 and/or the apparatus in FIGS. 2A and 2B to control the selector in FIG. 4.

Referring to FIG. 6, in an exemplary embodiment, a schematic diagram illustrates a selector control arrangement 300 using the SP monitor 120/apparatus 20 to control the selector 118. The selector control arrangement 300 can be used at the nodes 106, 108 in the optical network 100 to control the selector 118 based on a presence or absence of a particular data-modulated wavelength, namely a wavelength of interest ($\lambda_{RX}$) R1, R2 in one or more wavelengths ($\lambda_1, \lambda_2, \ldots, \lambda_N$) 302 on the paths 102, 104. The selector control arrangement 300 can include two sets of equipment, for each of the paths 102, 104. The selector control arrangement 300 includes a broadband signal detector 310 which includes the detectors 30, 32, receiving outputs from the coupler 22. The coupler 22 receives the one or more wavelengths ($\lambda_1$, $\lambda_2$, ..., $\lambda_N$) 302 and the LO signal T1, T2 26A, 26B. The broadband signal detector 310 can be configured to perform the coherent detection and can include the envelope detector 40 (not shown). The broadband signal detector 310 is coupled to the selector 118 to provide a notification of the presence of the wavelength of interest ($\lambda_{RX}$) R1, R2 in the one or more wavelengths ($\lambda_1$, $\lambda_2$, ..., $\lambda_N$) 302 on the paths 102, 104.

When the one or more wavelengths ($\lambda_1$, $\lambda_2$, ..., $\lambda_N$) 302 contains the wavelength of interest ($\lambda_{RX}$), coherent mixing of the LO signal T1, T2 26A, 26B and the one or more wavelengths ($\lambda_1$, $\lambda_2$, ..., $\lambda_N$) 302 down-converts the one or more wavelengths ($\lambda_1$, $\lambda_2$, ..., $\lambda_N$) 302 into a baseband signal. The RF envelope detector 40 measures the integrated power of the baseband signal over its electrical bandwidth. If the measured power exceeds a pre-defined threshold, the wavelength of interest ($\lambda_{RX}$) is deemed to be present in the one or more wavelengths ($\lambda_1$, $\lambda_2$, ..., $\lambda_N$) 302.

Figure 7:
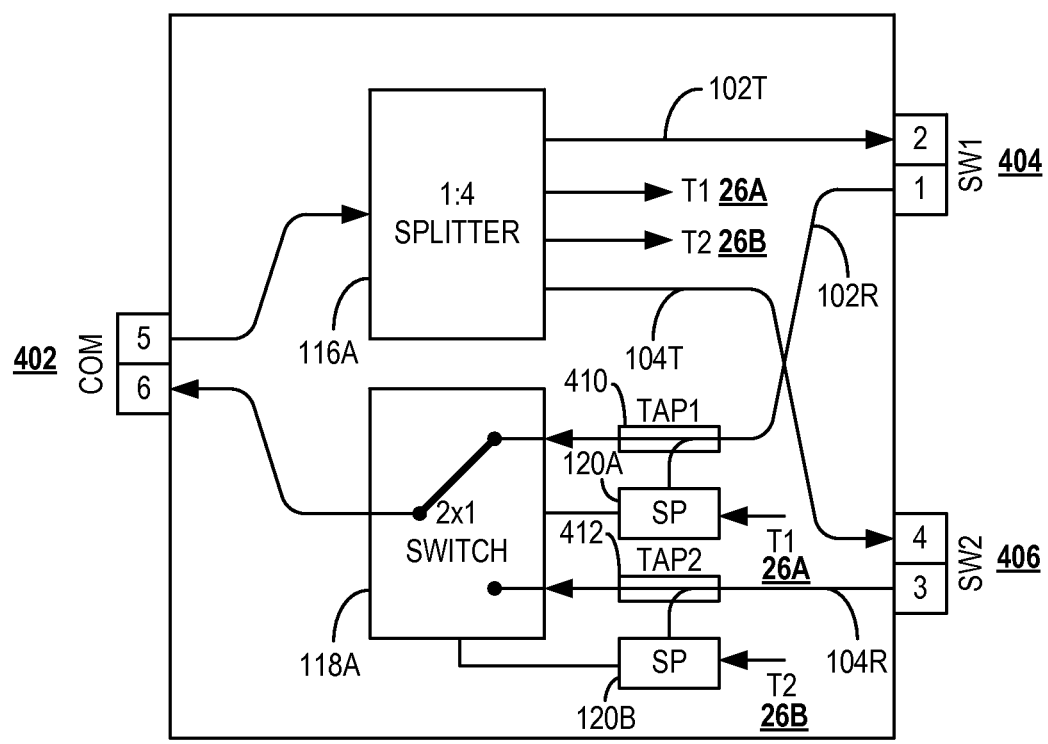
FIG. 7 is a schematic diagram of an Optical Protection Switch (OPS) utilizing the process of FIG. 1 and/or the apparatus of FIGS. 2A and 2B to control a 2×1 switch for optical 1+1 path protection.

Referring to FIG. 7, in an exemplary embodiment, a schematic diagram illustrates an Optical Protection Switch (OPS) 400 utilizing the process 10 and/or the apparatus 20 to control a 2×1 switch 118A for optical 1+1 path protection. The OPS 400 can be housed in a physical housing such as a module, rack-mounted enclosure, line card, etc. which can include three ports 402, 404, 406, namely a common port 402 and line ports 404, 406. Each of the ports 402, 404, 406 include a transmit and a receive connection, for a bi-directional communication link. The common port 402 is communicatively coupled to a network device (not shown) being protected by the optical 1+1 path protection. The network device has a single TX/RX connection to the OPS 400. The network device can include, for example, a switch, a router, Customer Premises Equipment (CPE), etc. The line ports 404, 406 connect to the paths 102, 104, respectively.

The OPS 400 is configured to provide the functionality described at the nodes 106, 108, namely the OPS 400 is configured to transmit a transmitted wavelength ($\lambda_{TX}$) from the common port 402 to both of the line ports 404, 406 via a 1:4 splitter 116A, similar to the transmitter arrangement 200, which also forms the LO signals 26A, 26B. The OPS 400 is configured to present the received signal containing wavelength ($\lambda_{RX}$) to the common port 402 from either one of the line ports 404, 406, based on the operation of the process 10. Specifically, the OPS 400 includes taps 410, 412 coupled to the receive side of the line ports 404, 406 which provide the one or more wavelengths on the receive side to SP monitors 120A, 120B. The SP monitors 120A, 120B also receives the LO signals 26A, 26B to perform the process 10. Outputs of the SP monitors 120A, 120B are provided to the 2×1 switch 118A to provide details on which of the line ports 404, 406 have the received wavelength ($\lambda_{RX}$) present.

Figure 8:
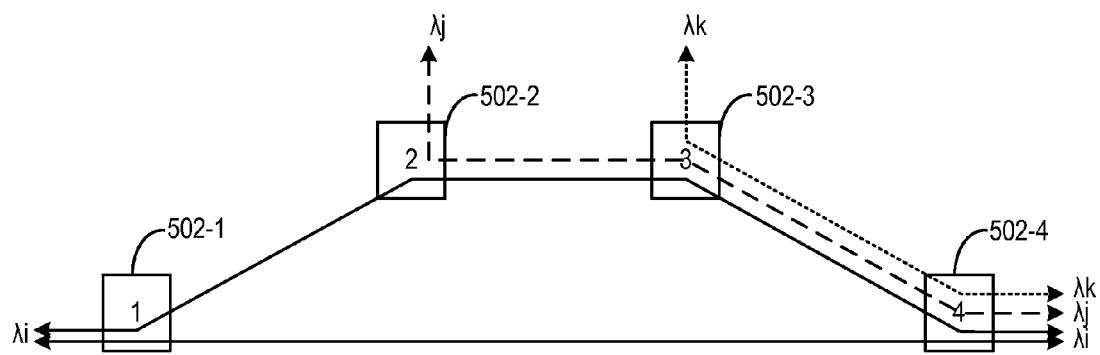
FIGS. 8-10 are network diagrams of a network for describing a problem statement associated with the OPS of FIG. 7 required for using the process of FIG. 1 and/or the apparatus of FIGS. 2A and 2B; specifically.
Figure 9:
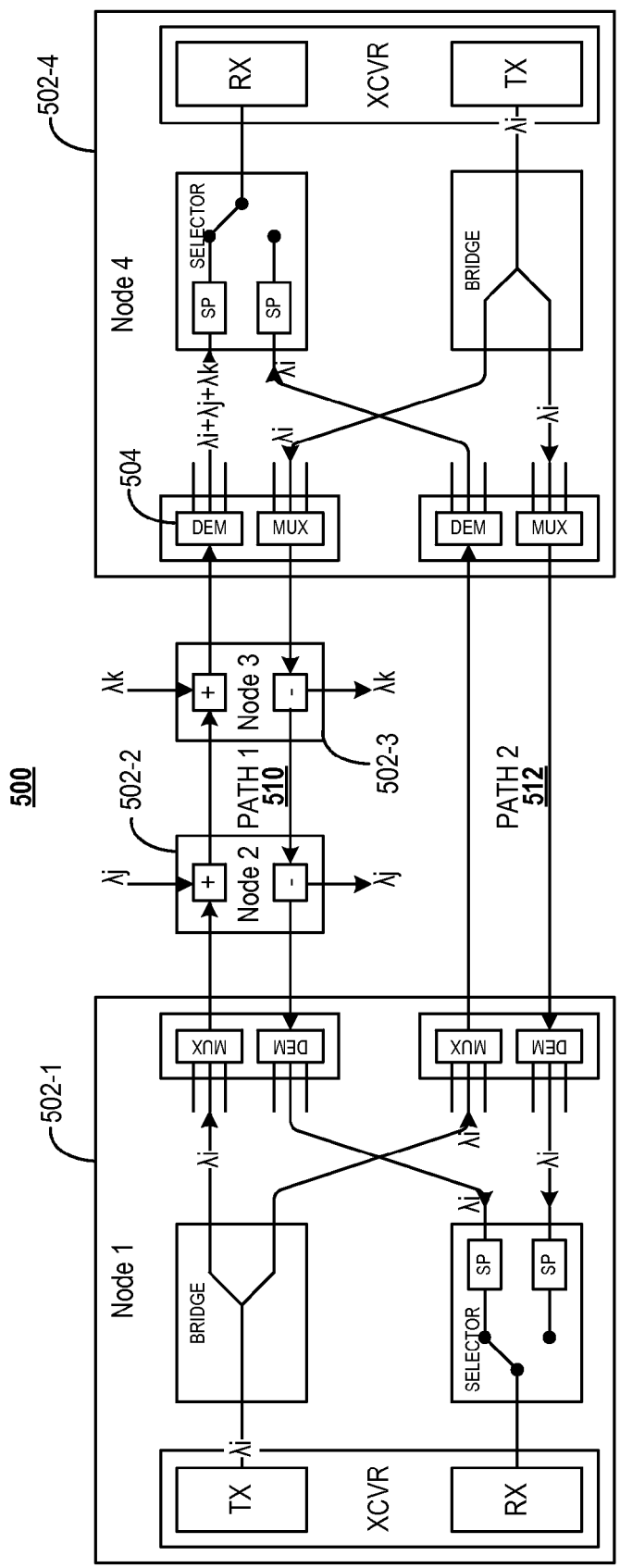
Figure 10:
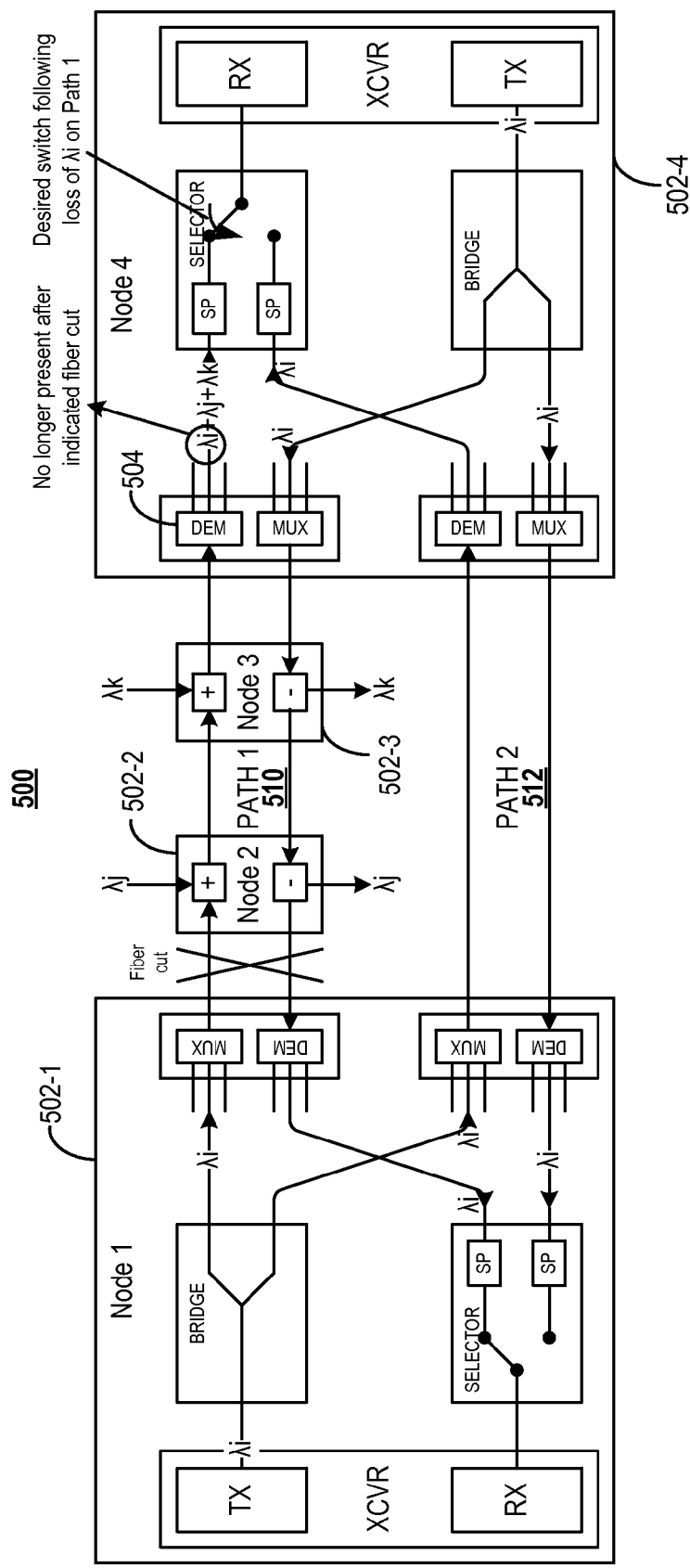

Referring to FIGS. 8-10, in an exemplary embodiment, network diagrams illustrate a network 500 for describing a problem statement associated with the OPS 400 required for using the process 10 and/or the apparatus 20. FIG. 8 illustrates the topology of the network 500 with nodes 502-1, 502-2, 502-3, 502-4, FIG. 9 illustrates associated OPS 400 components at nodes 502-1, 502-4 in the network 500, and FIG. 10 illustrates activity based on a fiber cut between the nodes 502-1, 502-2. Specifically, the network 500 illustrates an exemplary embodiment where multiple wavelengths are present at the OPS 400 input. In FIG. 8, the network includes three connections, $\lambda_i$, $\lambda_j$, $\lambda_k$, all terminating at the node 502-4. The connection $\lambda_i$ is protected using optical 1+1 path protection between the nodes 502-1, 502-4. For illustration purpose, the connections $\lambda_j$, $\lambda_k$ are each terminated as well at the node 502-4, but originate at different nodes, i.e., the nodes 502-2, 502-3. The connections $\lambda_j$, $\lambda_k$ are present along with the connection $\lambda_i$ from on an input to the OPS 400 at the node 502-4.

Thus, the problem statement can be formulated as follows: the connection $\lambda_i$ optical 1+1 path protection between the nodes 502-1, 502-4, with a path 510 between the nodes 502-1, 502-2, 502-3, 502-4 and a path 512 between the nodes 502-1, 502-4. In FIG. 9, a demultiplexer 504 at the node 502-4 is a type that allows multiple wavelengths on each tributary port. For example, the demultiplexer 504 can be a 1:N power splitter. The nodes 502-2, 502-3 are located on one of the paths between the nodes 502-1, 502-4—the connection $\lambda_j$ exists between the nodes 502-2, 502-4, and the connection $\lambda_k$ exists between the nodes 502-3, 502-4 and the connection $\lambda_i$ is presently routed over the path 510. In FIG. 10, a fiber cut occurs on the fiber between the nodes 502-1, 502-2. Thus, the optical 1+1 path protection scheme must detect the failure on the path 510 and switch to the path 512. Note, the OPS 400 needs to be able to detect the absence of the connection $\lambda_i$ while the connections $\lambda_j$, $\lambda_k$ are still present.

It will be appreciated that some exemplary embodiments described herein may include one or more generic or specialized processors ("one or more processors") such as microprocessors, digital signal processors, customized processors, and field programmable gate arrays (FPGAs) and unique stored program instructions (including both software and firmware) that control the one or more processors to implement, in conjunction with certain non-processor circuits, some, most, or all of the functions of the methods and/or systems described herein. Alternatively, some or all functions may be implemented by a state machine that has no stored program instructions, or in one or more application specific integrated circuits (ASICs), in which each function or some combinations of certain of the functions are implemented as custom logic. Of course, a combination of the aforementioned approaches may be used. Moreover, some exemplary embodiments may be implemented as a non-transitory computer-readable storage medium having computer readable code stored thereon for programming a computer, server, appliance, device, etc. each of which may include a processor to perform methods as described and claimed herein. Examples of such computer-readable storage mediums include, but are not limited to, a hard disk, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory), Flash memory, and the like. When stored in the non-transitory computer readable medium, the software can include instructions executable by a processor that, in response to such execution, cause a processor or any other circuitry to perform a set of operations, steps, methods, processes, algorithms, etc.

Although the present disclosure has been illustrated and described herein with reference to preferred embodiments and specific examples thereof, it will be readily apparent to those of ordinary skill in the art that other embodiments and examples may perform similar functions and/or achieve like results. All such equivalent embodiments and examples are within the spirit and scope of the present disclosure, are contemplated thereby, and are intended to be covered by the following claims.

What is claimed is:

1. A method to detect a wavelength of interest ($\lambda_{RX}$) amongst one or more wavelengths ($\lambda_1, \lambda_2, \ldots, \lambda_N$), the method comprising:
   receiving the one or more wavelengths ($\lambda_1, \lambda_2, \ldots, \lambda_N$);
   using a portion of a transmitted wavelength ($\lambda_{TX}$) as a Local Oscillator (LO) signal to perform coherent detection with the one or more wavelengths, wherein the transmitted wavelength ($\lambda_{TX}$) and the wavelength of interest ($\lambda_{RX}$) are a bi-directional communication link; and
   determining a presence of the wavelength of interest ($\lambda_{RX}$) in the one or more wavelengths based on the coherent detection.

2. The method of claim 1, wherein the wavelength of interest ($\lambda_{RX}$) is approximately equal to transmitted wavelength ($\lambda_{TX}$) to within signal spectral occupancy.

3. The method of claim 1, wherein the transmitted wavelength ($\lambda_{TX}$) is transmitted by a transmitter, and wherein the transmitter is part of one of a transceiver and an optical modem.

4. The method of claim 1, wherein the receiving is performed separately from two paths, wherein the using comprises forming two signals T1 and T2 each with the transmitted wavelength ($\lambda_{TX}$) as the Local Oscillator (LO) signal, and wherein the coherent detection uses the signals T1 and T2 with the one or more wavelengths ($\lambda_1, \lambda_2, \ldots, \lambda_N$) from each of the two paths to determine the presence on each of the two paths.

5. The method of claim 1, further comprising:
   utilizing the presence in optical 1+1 path protection.

6. The method of claim 1, wherein the transmitted wavelength ($\lambda_{TX}$) and the wavelength of interest ($\lambda_{RX}$) have different modulated data thereon, and the coherent detection is used for power detection and not data detection.

7. The method of claim 1, wherein the coherent detection comprises a balanced coupler with differential detectors followed by a Radio Frequency (RF) envelope detector adapted to measure a power of a baseband signal to determine the presence of $\lambda_{RX}$.

8. The method of claim 1, wherein the portion is formed by a tap off of a transmitter adapted to transmit the transmitted wavelength ($\lambda_{TX}$).

9. The method of claim 1, wherein the transmitted wavelength ($\lambda_{TX}$) and the wavelength of interest ($\lambda_{RX}$) are dual-polarization signals, and wherein the coherent detection comprises a coupler adapted to receive the LO signal and the one or more wavelengths ($\lambda_1, \lambda_2, \ldots, \lambda_N$) and provide outputs to two detectors which provide a subtracted output to an envelope detector.

10. The method of claim 1, wherein the transmitted wavelength ($\lambda_{TX}$) and the wavelength of interest ($\lambda_{RX}$) are single polarization signals, and wherein the coherent detection is performed on two polarizations to determine the presence.

11. The method of claim 1, wherein the transmitted wavelength ($\lambda_{TX}$) is transmitted by a local transmitter and the wavelength of interest ($\lambda_{RX}$) is received by a local receiver.

12. An apparatus adapted to detect a wavelength of interest ($\lambda_{RX}$) amongst one or more wavelengths ($\lambda_1, \lambda_2, \ldots, \lambda_N$), the apparatus comprising:
   one or more couplers adapted to receive the one or more wavelengths ($\lambda_1, \lambda_2, \ldots, \lambda_N$) and a portion of a transmitted wavelength ($\lambda_{TX}$) as a Local Oscillator (LO) signal, wherein the transmitted wavelength ($\lambda_{TX}$) and the wavelength of interest ($\lambda_{RX}$) are a bi-directional communication link;
   a plurality of detectors adapted to receive outputs from the one or more couplers, wherein the one or more couplers and the plurality of detectors are adapted to perform coherent detection with the one or more wavelengths and the LO signal; and
   an envelope detector adapted to receive a combined output from the plurality of detectors and adapted to determine a presence of the wavelength of interest ($\lambda_{RX}$) in the one or more wavelengths.

13. The apparatus of claim 12, wherein the wavelength of interest ($\lambda_{RX}$) is approximately equal to transmitted wavelength ($\lambda_{TX}$) to within signal spectral occupancy.

14. The apparatus of claim 12, wherein the transmitted wavelength ($\lambda_{TX}$) is transmitted by a transmitter, and wherein the transmitter is part of one of a transceiver and an optical modem.

15. The apparatus of claim 12, wherein the one or more wavelengths ($\lambda_1, \lambda_2, \ldots, \lambda_N$) are separately received from two paths, wherein the two signals T1 and T2 are formed from a transmitter with the transmitted wavelength ($\lambda_{TX}$) as the Local Oscillator (LO) signal, and wherein the signals T1 and T2 are used with the one or more wavelengths ($\lambda_1, \lambda_2, \ldots, \lambda_N$) from each of the two paths to determine the presence on each of the two paths.

16. The apparatus of claim 12, wherein the transmitted wavelength ($\lambda_{TX}$) and the wavelength of interest ($\lambda_{RX}$) have different modulated data thereon, and the coherent detection is used for power detection and not data detection.

17. The apparatus of claim 12, wherein the coherent detection comprises a balanced coupler with differential detectors followed by the envelope detector adapted to measure a power of a baseband signal to determine the presence.

18. The apparatus of claim 12, wherein the portion is formed by a tap off of a transmitter adapted to transmit the transmitted wavelength ($\lambda_{TX}$).

19. The apparatus of claim 12, wherein the transmitted wavelength ($\lambda_{TX}$) and the wavelength of interest ($\lambda_{RX}$) are single polarization signals, and wherein the coherent detection is performed on two polarizations to determine the presence.

20. An optical 1+1 path protection system, comprising:
   a splitter adapted to receive and split a transmitted wavelength ($\lambda_{TX}$), wherein a split portion of a transmitted wavelength ($\lambda_{TX}$) is used a Local Oscillator (LO) signal;
   a selector adapted to receive two inputs each comprising one or more wavelengths ($\lambda_1, \lambda_2, \ldots, \lambda_N$); and
   a signal presence monitor adapted to determine a presence of a wavelength of interest ($\lambda_{RX}$) in each of the two inputs based on coherent detection using the LO signal and the one or more wavelengths ($\lambda_1, \lambda_2, \ldots, \lambda_N$), wherein the signal presence monitor is adapted to control the selector based on the presence, and wherein the transmitted wavelength ($\lambda_{TX}$) and the wavelength of interest ($\lambda_{RX}$) are a bi-directional communication link.

* * * * *